Figure 1:
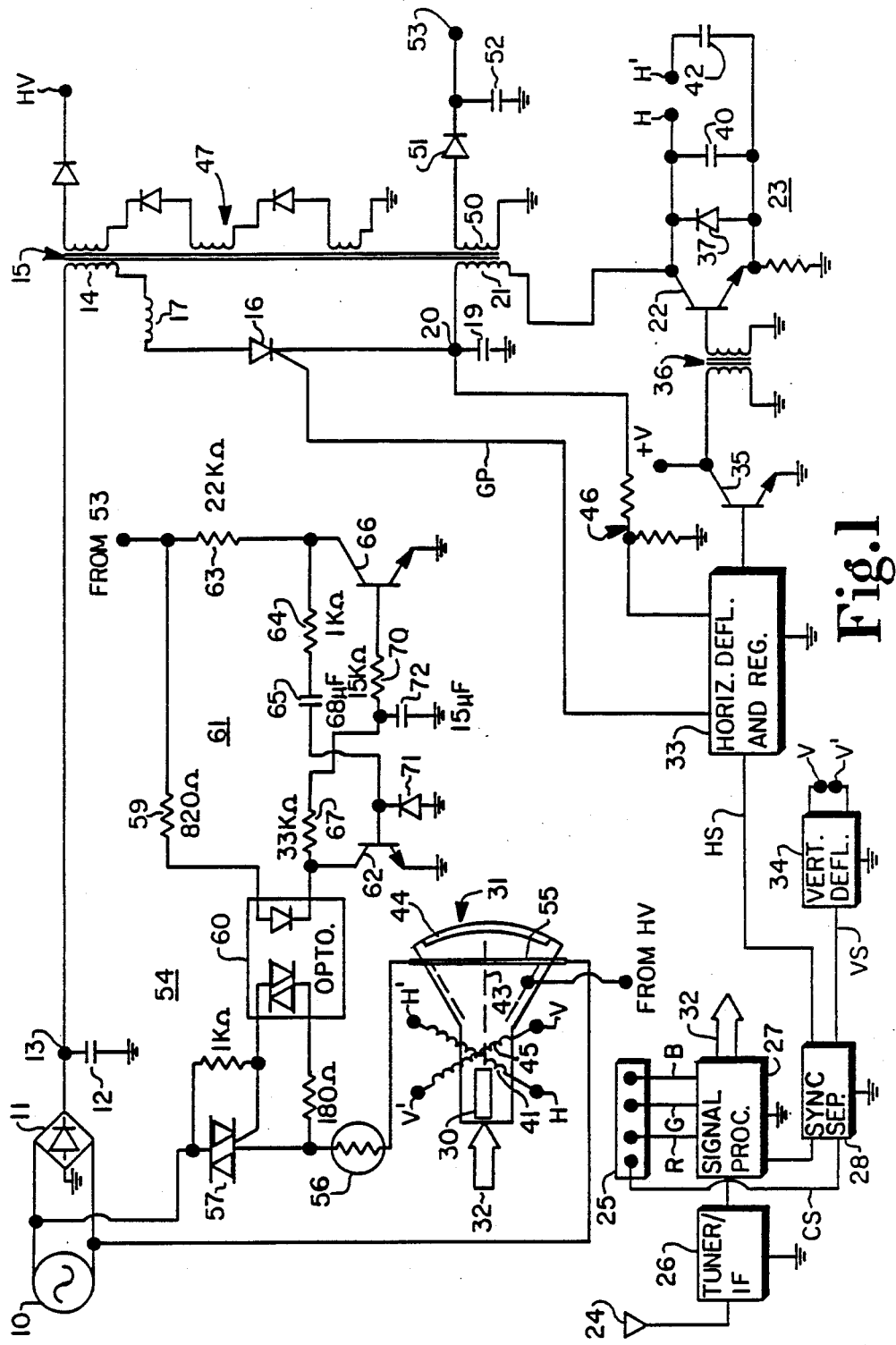

United States Patent [19]

Lendaro

[11] Patent Number: 4,829,214
[45] Date of Patent: May 9, 1989

[54] CATHODE RAY TUBE DEGAUSSING CONTROL CIRCUIT

[75] Inventor: Jeffery B. Lendaro, Noblesville, Ind.

[73] Assignee: RCA Licensing Corporation, Princeton, N.J.

[21] Appl. No.: 938,944

[22] Filed: Dec. 8, 1986

[51] Int. Cl.$^4$ .............................................. H04N 9/29
[52] U.S. Cl. ........................................ 315/8; 361/150
[58] Field of Search .................... 315/8; 361/150, 267

[56] References Cited

U.S. PATENT DOCUMENTS

| | | | |
|---|---|---|---|
| 4,153,858 | 5/1979 | Schylander | 315/8 |
| 4,295,078 | 10/1981 | Wilmarth | 315/8 |
| 4,441,052 | 4/1984 | Willis | 315/8 |
| 4,445,072 | 4/1984 | Freores | 315/8 |
| 4,458,178 | 6/1984 | Tenney et al. | 315/8 |
| 4,489,253 | 12/1984 | Godawski | 315/8 |
| 4,636,911 | 1/1987 | Truskalo | 361/150 |

FOREIGN PATENT DOCUMENTS 59-89094  5/1984  Japan ........................ 315/8

Primary Examiner—David K. Moore
Assistant Examiner—Mark R. Powell
Attorney, Agent, or Firm—Eugene M. Whitacre; Joseph J. Laks; Sammy S. Henig

[57] ABSTRACT

A degaussing circuit for a video apparatus incorporates circuitry that controls various aspects of the degaussing operation. The control circuitry causes the degaussing current to be terminated after a period of time to eliminate the flow of residual degaussing current. The control circuit also causes the degaussing circuit to be reset, to enable redegaussing to occur. The control circuit also prevents redegaussing from occurring after a brief interruption of power to the video apparatus.

16 Claims, 2 Drawing Sheets

CATHODE RAY TUBE DEGAUSSING CONTROL CIRCUIT

This invention relates to degaussing circuits for video apparatus and, in particular, to degaussing circuits having degaussing current disconnect and power interruption control functions.

Cathode ray tubes for color video apparatus require periodic degaussing, or demagnetization, of the metal parts of the tube and surrounding circuitry in order to prevent degradation of tube color purity. The magnetization of the tube metallic parts can occur due to the presence of the earth's magnetic field or due to stray fields produced by motors or electrical equipment operating near the video apparatus. Since the orientation of the earth's magnetic field with respect to the tube changes each time the video apparatus is moved, degaussing may be frequently required, particularly in the operation of computer monitors, which are often moved or rotated to accommodate different users.

A typical degaussing circuit includes the use of temperature dependent resistors, or thermistors, that change in resistance value as they become heated by the flow of degaussing current derived from the 60 Hz AC line. This change in resistance value is utilized by appropriate circuitry to cause the degaussing current to decrease in a desired manner to effect demagnetization of the metallic parts of the tube. This arrangement is economical and provides effective degaussing; however, since the degaussing current does not decay to zero, residual degaussing current may continue to flow such that this residual current may result in some undesirable magnetization of the tube. Additionally, in order to provide repeated degaussing, the video display apparatus must be turned off for several minutes to allow the thermistors to cool so that sufficient degaussing current is permitted to flow when the set is reenergized. This is inconvenient when used in a computer monitor where the monitor may be moved during operation.

It is therefore desirable to provide some means for terminating the degaussing current flow after a sufficient degaussing interval in order to prevent residual degaussing current magnetization of the tube and to allow the video apparatus to be repeatedly degaussed without long waiting periods during which the video apparatus is off while the degaussing circuit thermistors cool.

It is also desirable to provide some means that prevents unnecessary degaussing after transient power interruptions, such as may occur during electrical storms, for example.

In accordance with an aspect of the present invention, a degaussing circuit for a cathode ray tube of a video apparatus comprises a source of alternating current and a source of potential. A degaussing coil is located adjacent to the cathode ray tube. A switch, capable of being switched between first and second conductive states, is responsive to the application of the source of potential for entering the first conductive state in order to couple the source of alternating current to the degaussing coil. Means responds to the alternating current flow in the degaussing coil for decreasing the current flow in a manner to degauss the cathode ray tube. Control circuitry includes a first circuit that maintains the switch in the first conductive state for a first predetermined interval associated with a first time constant. A second circuit disables the first circuit when power is removed from the video apparatus for less than a second interval associated with a second time constant. The second circuit also enables the first circuit for degaussing the cathode ray tube when power is restored to the video apparatus after an interval longer than the second interval.

Figure 2:
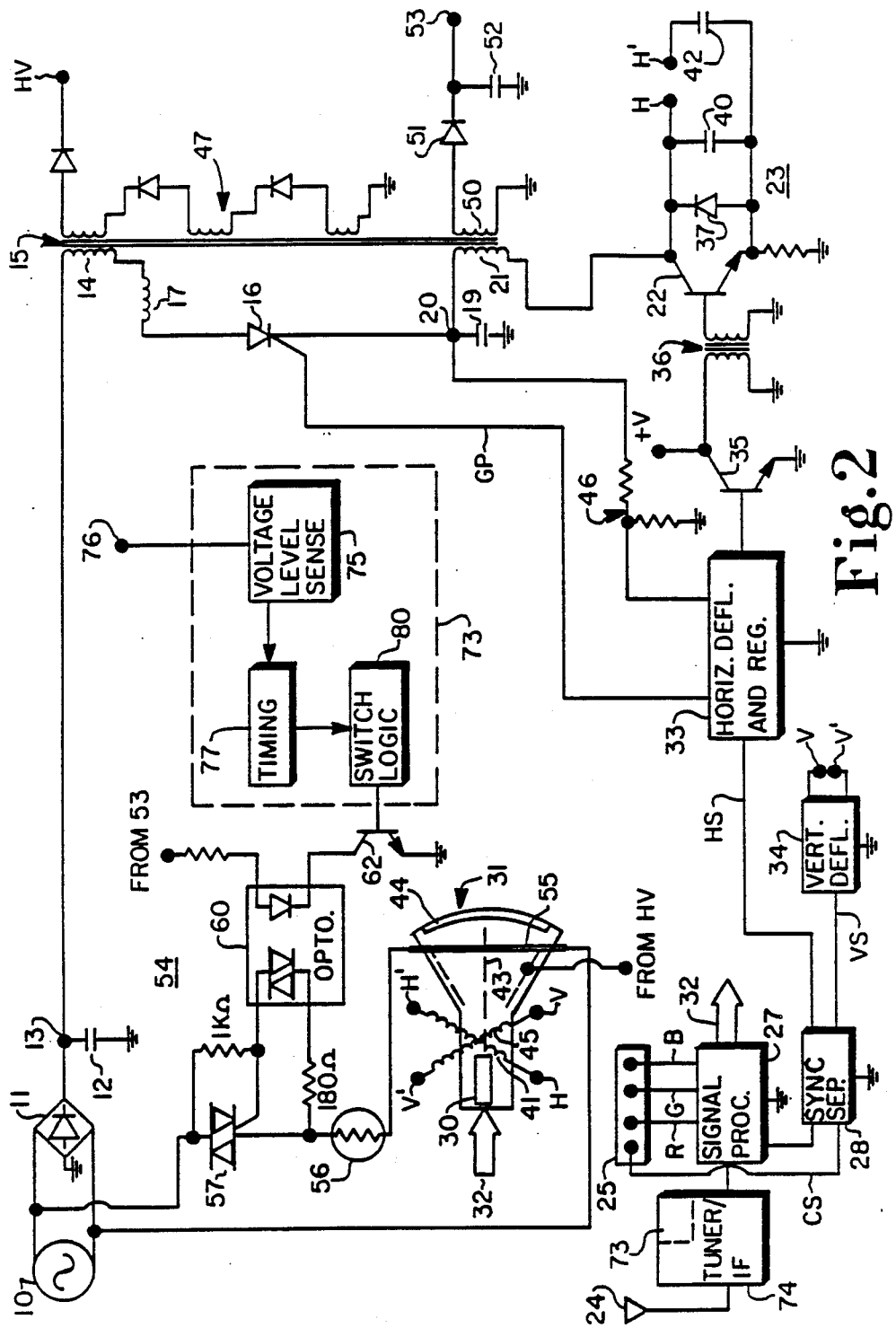

In the accompanying drawing,

FIG. 1 is a block and schematic diagram of a portion of a video apparatus incorporating a degaussing circuit in accordance with an aspect of the present invention; and FIG. 2 is a block and schematic diagram of a video apparatus similar to that shown in FIG. 1 incorporating an alternate embodiment of a degaussing circuit in accordance with an aspect of the present invention.

Referring to FIG. 1, a power source 10, such as an AC line supply, is coupled to a rectifying circuit 11, the output of which is filtered by a capacitor 12 to provide a source of unregulated DC voltage at a terminal 13. The unregulated DC voltage is applied to one terminal of a winding 14 of power transformer 15. The other terminal of winding 14 is coupled to the anode of an SCR 16 via an inductor 17. The conduction of SCR 16 is controlled in a manner that will be described later to produce a regulated DC voltage across capacitor 19 at a terminal 20, located at the cathode of SCR 16. The regulated DC voltage is applied via a primary winding 21 of transformer 15 to the collector of a horizontal deflection output transistor 22, which forms part of a horizontal deflection output circuit 23.

The video apparatus shown in FIG. 1, such as a television receiver or computer monitor, for example, illustratively receives an input signal from an antenna 24, in the case of a television receiver, or via an input terminal block 25 from an external source of signals, in the case of a computer monitor. The radio frequency signal from antenna 24 is applied to tuner and intermediate frequency (IF) circuitry 26, the output of which is applied to signal processing circuitry 27 and to synchronizing (sync) pulse separator circuit 28. Signal processing circuitry 27 may, for example, include the functions of video detection, chrominance processing and luminance processing. Signal processing circuitry provides the drive signals to the electron gun assembly 30 of a cathode ray tube 31 via a conductor 32. Sync separator 28 provides the individual horizontal, or line rate, and vertical, or field rate, pulses from the composite video signal output of signal processing circuitry 27. The signal from terminal block 25 illustratively provides direct red, green and blue video signals designated R, G and B, to signal processing circuitry 27, as well as a composite synchronizing signal, designated CS, to sync separator circuit 28.

The vertical, or field-rate, synchronizing signal is applied via a conductor designated VS to a vertical deflection circuit 34, which produces vertical deflection current via terminals V and V' in a vertical deflection winding 45, located on the neck of CRT 31. Deflection current flow in winding 45 causes the deflection or scanning of a representative electron beam 43, produced by electron gun assembly 30, in a vertical direction across the phosphor display screen 44 of CRT 31.

The horizontal, or line-rate, synchronizing signal is applied, via a conductor designated HS, to horizontal deflection and power supply regulator circuitry 33, which provides a horizontal rate switching signal to a driver transistor 35. Switching of transistor 35 in turn causes switching pulses to be applied to the base of horizontal output transistor 22 via driver transformer 36. Horizontal deflection output circuit 23 illustratively comprises a conventional resonant retrace circuit including a damper diode 37, a retrace capacitor 40, a horizontal deflection winding 41, located on the neck of CRT 31, and an S-shaping capacitor 42. The operation of horizontal deflection output circuit 23 causes deflection current to flow in deflection winding 41 via terminals H and H', thereby generating electromagnetic deflection fields that deflect or scan electron beam 43 in a horizontal direction on the phosphor display screen 44 of CRT 31.

Horizontal deflection and regulator circuit 33 also produces horizontal deflection rate gating pulses along a conductor designated GP in order to switch SCR 16 into conduction. The time of occurrence of a gating pulse within each horizontal deflection interval is controlled in accordance with a feedback signal from voltage divider 46 in order to maintain a constant regulated voltage level at terminal 20. SCR 16 is commutated off in a conventional manner by retrace related pulses appearing across winding 14. The horizontal retrace pulses appearing across primary winding 21, produced by horizontal output circuit 23 in response to the switching of horizontal output transistor 22, cause voltage pulses to be developed across the other windings of transformer 15, including the previously described SCR - commutating pulses produced across winding 14. The voltage developed across winding 47 is rectified to provide, at a terminal designated HV, a high voltage or ultor potential of the order of 28 KV that is applied to CRT 31. The voltage developed across winding 50 is rectified by diode 51 and filtered by capacitor 52 to provide a regulated DC voltage source at a terminal 53 that may illustratively be used to power various load circuits of the video apparatus.

The presence of the earth's magnetic field and the nearby operation of electric motors may cause magnetization of the metallic parts of the video apparatus CRT, such as the shadow or aperture mask or grill. Such magnetization may distort the display screen beam landing position of the CRT electron beams, resulting in deterioration of CRT color purity. Correction of the effect of this magnetization requires periodic degaussing or demagnetization of the CRT, usually performed automatically each time the video apparatus is energized. in accordance with an aspect of the present invention, FIG. 1 illustrates a degaussing circuit 54 including a degaussing coil 55 disposed in a conventional manner about CRT 31, a positive temperature coefficient thermistor 56, and a switching device, such as a relay or a triac 57 as illustratively shown in FIG. 1. Conduction of triac 57 couples the alternating current line supply 10 to the degaussing coil 55 via PTC thermistor 56. In a conventional manner, current flow in PTC thermistor 56 increases its temperature and consequently the impedance of thermistor 56 increases, causing the magnitude of the alternating current to decrease in a manner that results in degaussing or demagnetization of the CRT 31.

In accordance with a novel aspect of the present invention, the gating signal that renders triac 57 conductive is supplied via an optocoupler 60 from a control circuit 61. Optocoupler 60 is of conventional design, such as that designated TLP560G, manufactured by Toshiba Corporation. Control circuit 61 operates as follows. When the video apparatus is turned on or energized, the DC supply voltage developed at terminal 53 is applied to the base of transistor 62 via resistors 63 and 64, and capacitor 65, thereby rendering transistor 62 conductive and driving it into saturation. Collector current flow through resistor 59 and optocoupler 60 as a result of the conduction of transistor 62 causes optocoupler 60 to produce an output signal that is applied to the gate of triac 57, rendering triac 57 conductive and initiating the previously described degaussing operation. Transistor 62 base current causes capacitor 65 to charge with a charging time constant determined by the values of resistors 63 and 64, and capacitor 65. As capacitor 65 charges, the current supplied to the base of transistor 62 decreases, bringing transistor 62 out of saturation and allowing the collector voltage of transistor 62 to increase. When the collector voltage of transistor 62 increases to a level illustratively of the order of 1 volt, the base of transistor 66 becomes biased sufficiently to cause transistor 66 to be rendered conductive. Current is then supplied to the base of transistor 66 via resistors 67 and 70. Conduction of transistor 66 shunts base current away from transistor 62, such that transistor 62 is rapidly rendered nonconductive. The current flow through optocoupler 60 is greatly reduced, with the result that an output signal is no longer produced. Triac 57 is rendered nonconductive and the flow of degaussing current is terminated, thereby eliminating any residual degaussing current flow that may otherwise degrade purity of CRT 31. It is important that the conductive state of transistor 62 is switched quickly, in order to insure that an abrupt termination of degaussing current occurs. Termination of degaussing current also allows PTC thermistor 56 to cool, thereby enabling additional degaussing operations to be performed, if desired, without long waiting intervals while the video apparatus is deenergized. The charging time constant provided by resistors 63 and 64, and capacitor 65 therefore determines the period of degaussing. This time constant should be selected to provide sufficient time to allow the degaussing current to decay to a level that insures effective degaussing is achieved. Conduction of transistor 66 also causes capacitor 65 to discharge via diode 71, resistor 64 and the collector-emitter path of transistor 66. Resistor 64 limits the peak discharge current through transistor 66. Discharge of capacitor 65 effectively resets or enables the degaussing timing circuit in order to insure that any future degaussing operations have a sufficient duration to insure effective degaussing takes place.

Capacitor 72 becomes charged by the base current of transistor 66 when transistor 66 is conducting. When power is removed from the video apparatus, capacitor 72 will discharge via resistor 70 and the base-emitter junction of transistor 66, maintaining transistor 66 in conduction for an interval determined by the time constant formed from capacitor 72 and resistor 70. During the occurrence of a brief interruption of power to the video apparatus, transistor 66 will still be conductive when power is restored, so that transistor 62 is continued to be rendered nonconductive; therefore a degaussing operation will not occur. This novel arrangement of the present invention therefore provides effective degaussing when desired or after a lengthy power interruption of the video apparatus, yet prevents unnecessary or undesirable redegaussing from occurring after brief power interruptions, of the order of 4 seconds or less, for example.

Although the novel aspects of the present invention have been illustratively described with reference to discrete component circuitry as shown in FIG. 1, other implementations are of course possible, such as the use of integrated circuits, for example. FIG. 2 illustrates the use of an integrated circuit microprocessor, such as that designated HD6305VO, manufactured by Hitachi. A microprocessor of this type performs functions determined by software programming incorporated within the microprocessor. FIG. 2 illustrates representative functions that may be performed. Elements corresponding to those shown in FIG. 1 are shown in FIG. 2 by identical reference characters.

Referring to FIG. 2, a microprocessor 73, which is illustratively shown as being embodied within the tuner and IF circuitry 74, comprises voltage level sensing circuitry 75 which monitors one or more voltage levels of the video apparatus via an illustrative terminal 76 in order to determine if normal power levels are being applied to the video apparatus. During a power interruption, for example, voltage level sensing circuitry 76 provides an output signal to timing circuitry 77 which is set to prevent redegaussing following a power interruption of less than a predetermined duration. If the predetermined duration has been exceeded when power is restored, as is indicated by a signal from voltage level sense circuitry 75, timing circuitry 77 causes switch drive circuit 80 to render transistor 62 conductive, initiating degaussing. Timing circuit 77 also controls the conduction interval of transistor 62 to insure effective degaussing. The associated intervals determined by timing circuitry 77 are of course easily set or changed via programming of microprocessor 73.

What is claimed is:

1. A degaussing circuit for a cathode ray tube of a video apparatus comprising:
   a source of alternating current;
   a source of potential;
   a degaussing coil disposed adjacent to said cathode ray tube;
   switch means capable of being switched between first and second conductive states, said switch means responsive to the application of said source of potential for entering said first conductive state for coupling said source of alternating current to said degaussing coil for causing said alternating current to flow in said degaussing coil;
   means coupled to said degaussing coil and responsive to the flow of alternating current in said degaussing coil for decreasing said current flow through said degaussing coil in a predetermined manner to effect degaussing of said cathode ray tube; and
   control means comprising:
   first means including a first capacitor for maintaining said switch means in said first conductive state for a first predetermined interval associated with the charging interval of said first capacitor; and
   second means including a second capacitor associated with a predetermined time constant for disabling said first means when power is temporarily removed from said video apparatus for less than a second predetermined interval associated with said predetermined time constant in order to prevent degaussing of said cathode ray tube when power is restored to said video apparatus and for enabling said first means for degaussing said cathode ray tube when power is restored to said video apparatus after being removed for an interval longer than said second predetermined interval.

2. The arrangement defined in claim 1, wherein said source of potential is developed from said source of alternating current.

3. The arrangement defined in claim 1, wherein said means for decreasing said degaussing current flow comprises a thermistor.

4. The arrangement defined in claim 1, wherein said time constant is established by a resistor-capacitor network.

5. The arrangement defined in claim 1, wherein said second means causes said switch means to occupy said second conductive state after said first predetermined interval for decoupling said source of alternating current from said degaussing coil.

6. A degaussing circuit for a cathode ray tube of a video apparatus comprising:
   a source of alternating current;
   a source of potential;
   a degaussing coil disposed adjacent to said cathode ray tube;
   switch means, capable of being switched between first and second conductive states, for coupling said source of alternating current to said degaussing coil when said switch means occupies said first conductive state;
   means coupled to said degaussing coil and responsive to the flow of alternating current in said degaussing coil when said source of alternating current is coupled to said degaussing coil for decreasing said current flow through said degaussing coil in a predetermined manner to effect degaussing of said cathode ray tube; and
   control means comprising:
   first means including a first capacitor for maintaining said switch means in said first conductive state for a first predetermined interval associated with the charging interval of said first capacitor;
   second means including a second capacitor for causing said switch means to enter said second conductive state after said first predetermined interval for decoupling said source of alternating current from said degaussing coil, said second means discharging said first capacitor when said switch means occupies said second conductive state for resetting said first means, said second means maintaining said switch means in said second conductive state when power is temporarily removed from said video apparatus for a second predetermined interval associated with the discharging interval of said second capacitor.

7. A degaussing circuit for a cathode ray tube of a video apparatus comprising:
   a source of an alternating current;
   a source of a supply voltage;
   a degaussing coil disposed adjacent to said cathode ray tube;
   switch means, entering a conductive state in response to an application of said supply voltage to said video apparatus, for coupling said source of said alternating current to said degaussing coil to cause said alternating current to flow in said degaussing coil;
   means coupled to said degaussing coil for decreasing the current flow through said degaussing coil in a predetermined manner to effect degaussing of said cathode ray tube;
   first means for generating a first control signal that is coupled to said switch means to maintain said switch means in said conductive state for a first interval; and second means responsive to said supply voltage for generating a second control signal that is indicative of an elapsed interval from a time when said supply voltage is temporarily removed from said video apparatus until a time when said supply voltage is restored thereto, said second control signal disabling said first means provided that said elapsed interval is shorter than a second interval, in order to prevent redegaussing of said cathode ray tube when said supply voltage is restored to said video apparatus, said second control signal enabling said first means to effect degaussing of said cathode ray tube provided that said elapsed interval is longer than said second interval.

8. An apparatus according to claim 8 wherein said switch means prevents any current from flowing in said degaussing coil after the occurence of said first interval.

9. An apparatus according to claim 7 wherein said second control signal generating means comprises a capacitor that is charged by said supply voltage when said supply voltage is applied to said video apparatus and that is discharged when said supply voltage is removed, for preventing redegaussing as long as a magnitude of a voltage in said capacitor is larger than a predetermined value.

10. A degaussing apparatus according to claim 7 wherein said second control signal generating means comprises a digital timing circuit.

11. A degaussing apparatus according to claim 10 wherein said first control signal generating means comprises said digital timing circuit.

12. A degaussing apparatus according to claim 7 wherein said first control signal generating means comprises means having a first time constant for establishing, in accordance with said first time constant, said first interval occuring when said first control signal is at a first state that causes said switch means to be conductive to enable degaussing.

13. A degaussing apparatus according to claim 12 wherein said second control signal generating means comprises means having a second time constant for sensing, in accordance with said second time constant, the length of said second interval when said supply voltage is removed.

14. An apparatus according to claim 7 wherein said first control signal generating means is responsive to said second control signal for disabling the generation of said first control signal when said elapsed interval is shorter than said second interval and wherein said second control signal is developed from said source of said alternating current and is indicative of a level of said supply voltage.

15. An apparatus as defined in claim 7, wherein said means for decreasing said degaussing current flow comprises a thermistor.

16. An apparatus according to claim 7 wherein said first control signal causes said switch means to be conductive during said first interval that includes said degaussing interval and to be nonconductive, after said first interval for preventing said alternating current from flowing in said degaussing coil.

* * * * *